(12) United States Patent
Ashley et al.

(10) Patent No.: US 8,272,018 B2
(45) Date of Patent: Sep. 18, 2012

(54) COMMUNICATION OF TV-ANYTIME CRIDS

(75) Inventors: Alexis Stephen Richard Ashley, Redhill (GB); Andrew James Hickman, London (GB); Octavius John Morris, Redhill (GB)

(73) Assignee: Koninklike Philips Electronics N.V., Eindhoven (NL)

( * ) Notice: Subject to any disclaimer, the term of this patent is extended or adjusted under 35 U.S.C. 154(b) by 1119 days.

(21) Appl. No.: 10/502,157

(22) PCT Filed: Jan. 14, 2003

(86) PCT No.: PCT/IB03/00076
§ 371 (c)(1),
(2), (4) Date: Jul. 20, 2004

(87) PCT Pub. No.: WO03/063492
PCT Pub. Date: Jul. 31, 2003

(65) Prior Publication Data
US 2005/0083865 A1     Apr. 21, 2005

(30) Foreign Application Priority Data
Jan. 24, 2002 (GB) .................................. 0201594.9

(51) Int. Cl.
*H04N 7/173* (2011.01)

(52) U.S. Cl. .............................. 725/86; 725/91; 725/100
(58) Field of Classification Search .................... 725/86, 725/91, 100, 114, 126, 131, 136, 138, 139, 725/144, 151; 370/464, 537
See application file for complete search history.

(56) References Cited

U.S. PATENT DOCUMENTS

| | | | |
|---|---|---|---|
| 7,159,232 B1 * | 1/2007 | Blackketter et al. | 725/38 |
| 7,188,353 B1 * | 3/2007 | Crinon | 725/32 |
| 7,200,857 B1 * | 4/2007 | Rodriguez et al. | 725/87 |
| 7,904,933 B2 * | 3/2011 | Crinon et al. | 725/138 |
| 2002/0152474 A1 * | 10/2002 | Dudkiewicz | 725/136 |

OTHER PUBLICATIONS

Semandex Netlink Content Distribution Network: Enhanced "Engineering Changes" Application, pp. 1-8.
TV-Anytime: Content Referencing Specification Series: S-4.
TV-Anytime: Content Referencing Requirements Series: R-4.

* cited by examiner

*Primary Examiner* — Brian Pendleton
*Assistant Examiner* — Olugbenga Idowu

(57) ABSTRACT

A method of creating an audio/video stream comprises multiplexing a video component, an audio component, a content reference identifier, and a semantic data packet containing information on the relationship between the video component and the content reference identifier. Apparatus for receiving the audio/video stream, and apparatus for transmitting the audio/video stream are disclosed.

16 Claims, 3 Drawing Sheets

Figure 1:
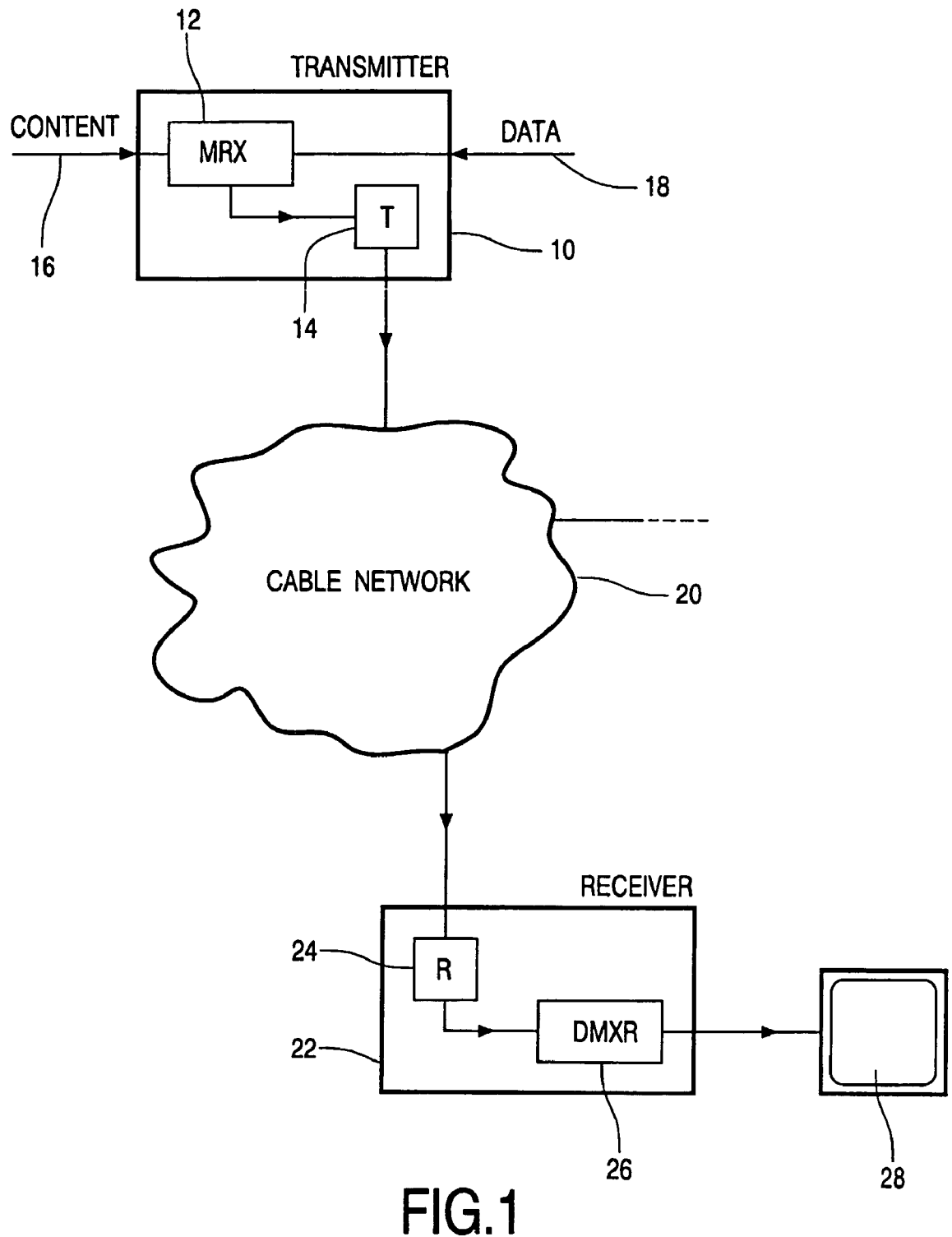

| Type | Group | Relationship | Example usage |
|---|---|---|---|
| Trailer | no | The current A/V content is a trailer for the programme identifying the CRID | Record the film being trailered |
| Trailer | yes | The current A/V content is a trailer for the group of programmes identified by the CRID | Record a forthcoming series being trailered |
| Sibbling | no | The programme identified by the CRID is a sibbling of the current A/V content | Record the next episode in a series whilst watching an earlier episode |
| Alternative | no | The CRID identifies an alternative version of a programme with the same editorial content of the current A/V stream | Whilst watching a programme the user discovers that a high definition version is available elsewhere |
| Parent | yes | A group of programmes identified by the CRID contain the programme which is the current A/V content | Record an entire series, whilst watching one of the episodes |
| Recommendation | no | The broadcaster considers there to be a relationship between the current A/V content and the programme identified by the CRID | Record a programme which the broadcaster recommends because of what the user is watching |
| Recommendation | yes | The broadcaster considers there to be a relationship between the current A/V content and the group of programmes identified by the CRID | Record a series which the broadcaster recommends because of what the user is watching |
| Advert | no | A product or service featured in the current A/V content is being advertised elsewhere. The CRID identifies the A/V content of that advert | The user is watching a film containing a desirable product. If the user indicates interest in that product an advert is captured providing further information |
| Other | yes/no | To be defined | |

FIG.4

COMMUNICATION OF TV-ANYTIME CRIDS

This invention relates to a method of creating an audio/video stream, apparatus for transmitting an audio/video stream, apparatus for receiving an audio/video stream and to the audio/video stream itself.

Traditionally, the small number of television channels and single method of delivery (wireless broadcast) meant that an end user could easily track the programme schedules to monitor the content delivered to them. However, following the introduction of digital television and the Internet, there has been a rapid increase of the number of channels (now numbering into the hundreds) and content available to an end user. Equally, the number of delivery methods is has also increased to include broadcast via fibre optic cable and the old copper wire telephone network. An end user is hard pressed to follow even a small proportion of the content available, with the resulting reduction in enjoyment of the available services.

Various interested parties are working on a number of methods of addressing this problem. One such group is the TV-Anytime Forum (www.tv-anytime.org) which is developing a system for searching, selecting, locating and acquiring content wherever (i.e. traditional broadcasting, Internet-based etc.) or whenever (i.e. scheduled or instantly accessible) it is made available. In order to realise this concept, the Forum has identified three distinct technical areas with requirements for standardisation, being metadata, content referencing and rights management. These three areas are considered to span the minimum basic features needed to implement a workable end-to-end TV-Anytime system, in which consumers can search for content, make selections, and acquire content for viewing or capture.

The document TV038r2 (7 Apr. 2000) "Requirements Series: R4 on Content Referencing Requirements (Normative)" produced by the TV Anytime Forum refers to various aspects of the content referencing. This document is incorporated by reference herein. The TV Anytime Forum has specified a Content Reference Identifier (CRID) that identifies a specific content item, but does not specify where that content item can be found. However there are problems associated with the content reference identifier and its communication to the end user in a way that is useful for that end user.

It is therefore an object of the invention to improve the communication of the content reference identifier.

According to a first aspect of the present invention, there is provided a method of creating an audio/video stream comprising multiplexing a video component, an audio component, a content reference identifier, and a semantic data packet containing information on the relationship between the video component and the content reference identifier.

According to a second aspect of the present invention, there is provided apparatus for transmitting an audio/video stream comprising a multiplexer for multiplexing a video component, an audio component, a content reference identifier, and a semantic data packet containing information on the relationship between the video component and the content reference identifier, and transmitting means for transmitting the resulting audio/video stream.

According to a third aspect of the present invention, there is provided apparatus for receiving an audio/video stream comprising receiving means for receiving an audio/video stream comprising a video component, an audio component, a content reference identifier, and a semantic data packet containing information on the relationship between the video component and the content reference identifier and a demultiplexer for demultiplexing said audio/video stream.

According to a fourth aspect of the present invention, there is provided an audio/video stream comprising a video component, an audio component, a content reference identifier, and a semantic data packet containing information on the relationship between the video component and the content reference identifier.

Owing to the invention, the end user is supplied with the content reference identifiers in an easily accessible manner and including semantic information on the relationship between the video component and the content reference identifier. By categorising the various ways in which a content reference identifier can be related to the video component and by labelling the semantics of these relationships, the apparatus for receiving an audio/video stream is able to process the identifier sensibly and is able to construct appropriate user interfaces accordingly.

Advantageously, the semantic data packet includes information on whether the content reference identifier is a current or a linking content referencing identifier. The audio/video stream may contain a second content reference identifier, and the semantic data packet contains information on both content reference identifiers. Preferably, the semantic data packet includes information as to whether the or each content reference identifier is time critical.

The apparatus for transmitting the audio/video stream transmits said audio/video stream via either a wireless connection (such as a radio link), or via a wired connection (such as a fibre optic cable). The apparatus for receiving the audio/video stream is preferably a digital television receiver. The audio/video stream can be transmitted by any suitable unidirectional delivery method, including traditional broadcast, Internet multicast and one to one file server delivery.

Embodiments of the invention will now be described, by way of example only, with reference to the accompanying drawings, in which:—

Figure 2:
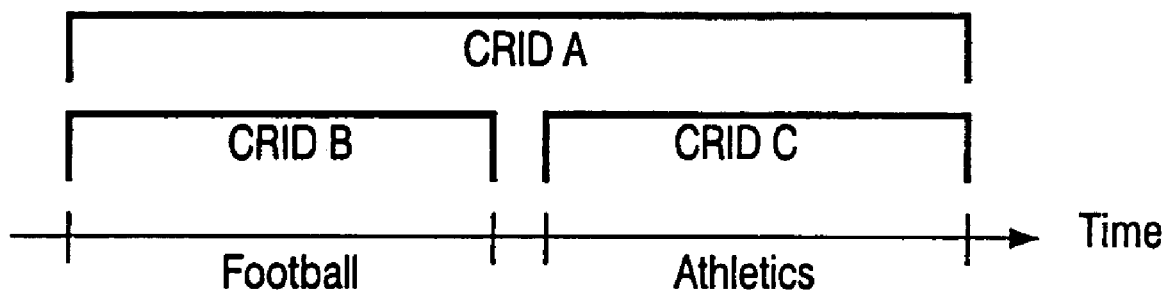
Figure 3:
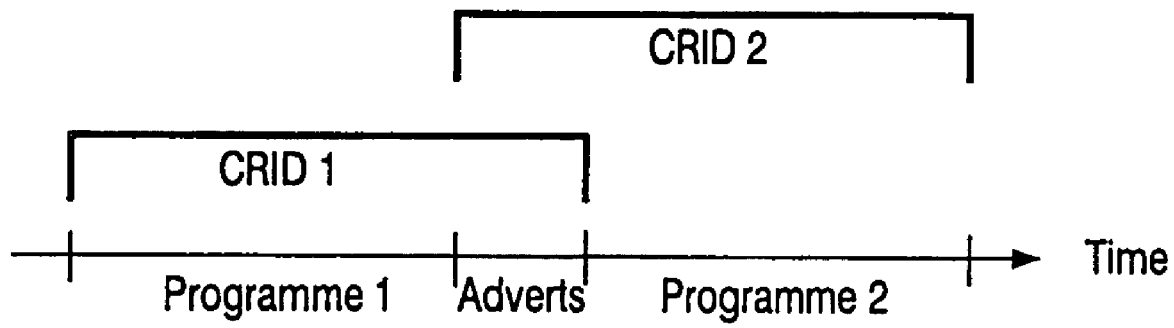

FIG. 1 is a schematic diagram of apparatus for transmitting an audio/video stream via a cable network to apparatus for receiving an audio/video stream, FIG. 2 is a schematic diagram of an audio/video stream, FIG. 3 is a schematic diagram of a second audio/video stream, and FIG. 4 is a table of linking content reference identifiers.

In FIG. 1, the apparatus for transmitting the audio/video stream is a transmitter 10 that comprises a multiplexer 12 and transmitting means 14. The multiplexer 12 is for multiplexing a video component, an audio component, a content reference identifier and a semantic data packet into an audio/video stream for transmitting via a suitable delivery network.

The video component and the audio component are shown as supplied to the multiplexer 12 as a single content stream 16, which may be retrieved from a database or be generated in real time from, for example, a sporting event. Equally, the multiplexer 12 could receive the video and audio components separately. The content reference identifier and the semantic data packet are likewise supplied to the multiplexer 12 as a single data stream 18, although as for the video and audio components, they could be supplied separately.

The semantic data packet contains information on the relationship between the video component and the content reference identifier. This is discussed in more detail below. The content reference identifier is unique to content being supplied, and functions as an identifying label for that content. The content reference identifier is generated according to a predefined rubric controlled by the content provider.

The audio/video stream comprising the video component, the audio component, the content reference identifier, and the semantic data packet is transmitted by the transmitting means 14 via a cable network 20 to receivers connected to that network 20. Equally, the transmitting means 14 could transmit the stream via a wireless connection, such as a standard modulated television signal or satellite broadcast.

One such receiver 22, in the form of a digital television receiver (commonly referred to as a set top box) is shown connected to the cable network 20. This apparatus for receiving an audio/video stream comprises receiving means 24 for receiving the audio/video stream and a demultiplexer 26 for demultiplexing the audio/video stream. Additionally, the receiver is provided with standard components such as a CPU, cache memory, main memory etc., not shown for reasons of clarity.

The receiving means 24 of the receiver 22 receives the audio/video stream comprising a video component, an audio component, a content reference identifier and a semantic data packet and supplies this stream to the demultiplexer 26 which splits the stream into its constituent parts. In normal operation, the demultiplexer 26 supplies the video component to a display device 28, which typically will have audio functionality to additionally receive the audio component.

An end user will therefore see displayed on the display device 28 the video stream for the channel that they have selected. The cache memory of the receiver 22 will store the content reference identifier and the semantic data packet. Using a suitable user interface, such as a remote control, a user can access functions of the receiver 22, usually through an on screen menu system.

In its simplest use, the content reference identifier will refer directly to the video stream in which it is embedded, simply being the label of that current content. This current content reference identifier can be used for such things as obtaining enhanced information about the current programme via the user interface. A user can select from an on screen menu an option to obtain information on the current programme. Once selected, the receiver 22 retrieves the content reference identifier from its cache memory and uses this to obtain further information on the programme, which may be retrieved from an associated website, or from data delivered by the transmitter 10.

However, in many situations the content reference identifier will not relate directly to the content being delivered, or there will be more than one content reference identifier in the audio/video stream. In these situations, the functionality of the receiver 22 is greatly enhanced by it being aware of the relationship between the video component of the audio/video stream and the content reference identifier or identifiers. This is achieved by the presence of the semantic data packet in the audio/video stream, which contains information on this relationship. The CPU is programmed to interpret the semantic data packet and to adjust the operation of the receiver 22 accordingly.

For example, if a trailer for a forthcoming programme is being shown, then the content reference identifier embedded in the stream will not be for the trailer, but will be for the actual programme being trailered. The semantic data packet will contain information that indicates to the receiver 22 that the content being delivered is a trailer for a future programme and that the content reference identifier is for the future programme. If the user of the receiver 22 then selects a record function during the broadcast of the trailer, the receiver will not record the present video and audio components of the audio/video stream. Instead, the receiver 22 will transfer the content reference identifier associated with the stream from its cache to a buffer in the main memory. The receiver 22 can capture the content of the selected programme according to the methodology of the TV Anytime content referencing standard.

A number of complicated situations arise when the audio/video stream contains a second content identifier. In this instance, the semantic data packet contains information on both content reference identifiers. Should there be more than two identifiers, then the semantic data packet contains information on all of the content reference identifiers and on their relationships to the video component of the audio/video stream.

For example, while a film is being broadcast, the audio/video stream will include a content reference identifier for the film itself, but may also include an identifier for a "making of . . ." programme that is to be broadcast soon and may also contain an identifier for the sequel to the film. The semantic data packet will contain categorising information on the different content reference identifiers, such that the receiver 22 will be able to tell which identifier is which and to render this information in a manner that is useful to the end user. Again taking the example of recording, if the end user selects the record function, they will be shown details of the film and of the different programmes linked to the film and then be able to choose the content that they are actually wish to record.

If the programme being broadcast has a hierarchical structure whereby the overall programme has smaller constituent parts, in addition to the content reference identifier for the overall programme, the sub-divisions will be allocated individual identifiers to allow them to be recorded in isolation. An example of this is a sports programme composed of different sporting events, illustrated in FIG. 2. The receiver 22 is able to distinguish between the different hierarchical type of identifier based upon the content of the associated semantic data packet, and therefore to handle the data differently and to present it to the user in a suitable fashion. Similar situations arise from programmes of "omnibus" and "magazine" format which will have content reference identifiers for the overall programme and for the different units within the programme.

It is also possible that the audio/video stream will contain two different content reference identifiers for two programmes that follow each other. Two programmes adjoining each other may share some common content that the broadcaster considers useful for the receiver 22 to capture if either of the programmes is recorded, illustrated in FIG. 3. This may be, for example, advertisements, or joining sections. Again this information is contained in the semantic data packet for processing by the receiver 22.

A combination of the above two scenarios (e.g. two magazine programmes adjoining each other) could lead to four or more identifier content reference identifiers being transmitted simultaneously. The receiver 22 is informed of the type and relationship of each identifier via the semantic data packet.

In effect, there are two types of content reference identifiers, a current and a linking content reference identifier. The semantic data packet includes information on whether the content reference identifier is a current or a linking content referencing identifier. A current content reference identifier refers directly to the content in which it is embedded, whereas a linking content reference identifier is one that refers to another programme, i.e. not the content in which it is embedded. FIG. 4 shows a table of various linking identifiers, and includes detail in relation to the type of information that would be carried in the semantic data packet. Reference to "A/V content" in this Figure refers to the audio and video content of the audio/video stream. The column headed "Group" refers to whether the content reference identifier relates to a group of programmes, or to a single programme.

Certain content reference identifiers are time critical, and the semantic data packet includes information as to whether the content reference identifier(s) is (are) time critical. For example, current content reference identifiers are time critical since the receiver 22 must start recording at the correct time, whereas a linking identifier that refers to related programmes is not time critical. The receiver 22 processes this information so that it can efficiently identify time critical content reference identifiers so that action can be taken in a timely fashion.

The invention claimed is:

1. A method of creating an audio/video stream including audio/video content items, the method comprising:
    multiplexing a video component, an audio component, and a content reference identifier which is an identifying label that identifies a specific audio/video content item, so as to obtain an audio/video content item,
    wherein further multiplexing a semantic data packet into said audio/video content item, wherein the semantic data packet contains information on the relationship between the video component and the content reference identifier in that said semantic data packet includes information on whether the content reference identifier is a current content referencing identifier or a linking content referencing identifier.

2. The method as claimed in claim 1, wherein said audio/video stream contains a second content reference identifier and the semantic data packet contains information on both content reference identifiers.

3. An apparatus for transmitting an audio/video stream including audio/video content items, the apparatus comprising a multiplexer for multiplexing a video component, an audio component, and a content reference identifier which is an identifying label that identifies a specific audio/video content item, so as to obtain an audio/video content item, wherein the multiplexer is arranged for further multiplexing a semantic data packet into said audio/video content item, wherein the semantic data packet contains information on the relationship between the video component and the content reference identifier in that said semantic data packet includes information on whether the content reference identifier is a current content referencing identifier or a linking content referencing identifier, and transmitting means for transmitting the resulting audio/video stream.

4. The apparatus as claimed in claim 3, wherein said transmitting means transmits said audio/video stream via a wireless connection.

5. The apparatus as claimed in claim 3, wherein said transmitting means transmits said audio/video stream via a wired connection.

6. An apparatus for receiving an audio/video stream including audio/video content items, the apparatus comprising:
    receiving means for receiving an audio/video content item comprising a video component, an audio component, and a content reference identifier which is an identifying label that identifies a specific audio/video content item, wherein the audio/video content item further comprises a semantic data packet, wherein the semantic data packet contains information on the relationship between the audio/video content item and the content reference identifier in that said semantic data packet includes information on whether the content reference identifier is a current content referencing identifier or a linking content referencing identifier, and
    a demultiplexer for demultiplexing said audio/video stream.

7. The apparatus as claimed in claim 6, wherein said apparatus is a digital television receiver.

8. The method as claimed in claim 1, wherein the information on the relationship between the video component and the content reference identifier is information related to another video component.

9. The method as claimed in claim 1, wherein the information on the relationship between the video component and the content reference identifier is information related to the relationship between two or more content reference identifiers and the video component.

10. The method as claimed in claim 1, wherein the semantic data packet includes information (1) on whether the content reference identifier is a current or a linking content referencing identifier or (2) as to whether the content reference identifier is time critical.

11. The apparatus as claimed in claim 6, wherein the semantic data packet includes information (1) on whether the content reference identifier is a current or a linking content referencing identifier or (2) as to whether the content reference identifier is time critical and a demultiplexer for demultiplexing said audio/video stream.

12. The method as claimed in claim 1, wherein the semantic data packet is used to adjust the operation/playback of the audio/video stream.

13. The apparatus as claimed in claim 3, wherein the semantic data packet is used to adjust the operation/playback of the audio/video stream.

14. The method as claimed in claim 1, wherein the audio/video content item resulting from the multiplexing of the video component, audio component, and content reference is a TV-Anytime audio/video stream and the audio/video stream is a combination of the TV-Anytime audio stream and the semantic data packet.

15. The method as claimed in claim 1, wherein the content reference identifier does not relate directly to the video/audio component or there is more than one content reference identifier.

16. The apparatus as claimed in claim 3, wherein the resulting audio/video stream is a combination of a TV-Anytime audio/video stream and the semantic data packet.

* * * * *